United States Patent
Zuo et al.

(10) Patent No.: US 10,911,149 B2
(45) Date of Patent: Feb. 2, 2021

(54) SIGNAL GENERATION METHOD AND ELECTRONIC DEVICE

(71) Applicant: Huawei Technologies Co., Ltd., Shenzhen (CN)

(72) Inventors: Tianjian Zuo, Shenzhen (CN); Sen Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/857,774

(22) Filed: Apr. 24, 2020

(65) Prior Publication Data

US 2020/0252132 A1 Aug. 6, 2020

Related U.S. Application Data

(63) Continuation of application No. PCT/CN2018/110295, filed on Oct. 15, 2018.

(30) Foreign Application Priority Data

Oct. 27, 2017 (CN) .......................... 2017 1 1023727

(51) Int. Cl.
*H04B 10/54* (2013.01)
*H04B 10/556* (2013.01)
*H04L 27/34* (2006.01)

(52) U.S. Cl.
CPC ....... *H04B 10/541* (2013.01); *H04B 10/5561* (2013.01); *H04L 27/34* (2013.01)

(58) Field of Classification Search
CPC ............ H04B 10/516–5563; H04L 27/34–368
See application file for complete search history.

(56) References Cited

U.S. PATENT DOCUMENTS

| 8,805,204 B2 * | 8/2014 | Zhang ................. H04B 10/541 398/183 |
| 2006/0127104 A1 | 6/2006 | Harley et al. |
| 2007/0071453 A1 | 3/2007 | Liu et al. |

(Continued)

FOREIGN PATENT DOCUMENTS

| CN | 1588939 A | 3/2005 |
| CN | 1638472 A | 7/2005 |

(Continued)

OTHER PUBLICATIONS

Ho, K., "Generation of Arbitrary Quadrature Signals Using One Dual-Drive Modulator," Journal of Lightwave Technology, IEEE, USA, vol. 23, No. 2, Feb. 1, 2005, pp. 764-770, XP011127627.

(Continued)

*Primary Examiner* — Casey L Kretzer

(74) *Attorney, Agent, or Firm* — Conley Rose, P.C.

(57) ABSTRACT

A signal generation method and an electronic device pertain to the field of communications technologies, and include normalizing an I path of four-level signals and a Q path of four-level signals to obtain a normalized I path of four-level signals and a normalized Q path of four-level signals, mapping the normalized I path of four-level signals and the normalized Q path of four-level signals based on a normalization coefficient to obtain two paths of six-level signals, and driving a dual-drive Mach-Zehnder modulator (DDMZM) based on the six-level signals.

20 Claims, 8 Drawing Sheets

(56) References Cited

U.S. PATENT DOCUMENTS

| | | | |
|---|---|---|---|
| 2011/0013907 A1 | | 1/2011 | Sugihara et al. |
| 2015/0236792 A1* | | 8/2015 | Sugihara .............. H04B 10/516 |
| | | | 398/183 |
| 2019/0081845 A1* | | 3/2019 | Rafique .............. H04B 10/5161 |

FOREIGN PATENT DOCUMENTS

| | | |
|---|---|---|
| CN | 101958863 A | 1/2011 |
| CN | 103051384 A | 4/2013 |
| CN | 104777495 A | 7/2015 |
| CN | 105530054 A | 4/2016 |
| WO | 2014206249 A1 | 12/2014 |

OTHER PUBLICATIONS

Choi, H, et al., "BER-adaptive flexible-format transmitter for elastic optical networks References and links," Aug. 13, 2012, vol. 20, No. 17, Optics Express 18652, XP055288609.

* cited by examiner

SIGNAL GENERATION METHOD AND ELECTRONIC DEVICE

CROSS-REFERENCE TO RELATED APPLICATIONS

This application is a continuation of International Patent Application No. PCT/CN2018/110295 filed on Oct. 15, 2018, which claims priority to Chinese Patent Application No. 201711023727.1 filed on Oct. 27, 2017. The disclosures of the aforementioned applications are hereby incorporated by reference in their entireties.

TECHNICAL FIELD

This disclosure relates to the field of communications technologies, and in particular, to a signal generation method and an electronic device.

BACKGROUND

In modern communications technologies, a signal modulation technology is an important means. Signal modulation is a process in which information of a signal source is processed and loaded to a carrier, and is enabled to become a form suitable for channel transmission, in short, a technology enabling a carrier to vary with a signal. A signal may have better transmission performance through signal modulation. In common signal modulation methods, based on different modulation parameters, the signal modulation methods may be mainly classified into three types: amplitude modulation, frequency modulation, and phase modulation. In amplitude modulation, 16 quadrature amplitude modulation (16 QAM) has a very high practical value.

The 16 QAM is a higher order modulation technology, and spectral efficiency of the 16 QAM is four times that of a non-return to zero (NRZ) signal. In the 16 QAM, a dual-polarization in-phase and quadrature Mach-Zehnder modulator (IQMZM) is usually used. FIG. 1 is a simple structural diagram of an IQMZM. The IQMZM includes two dual-drive Mach-Zehnder modulators (DDMZM). Phases of optical carrier signals of the two DDMZMs are different. One path of optical carrier signals is rotated by 90 degrees during output, and two paths of output signals are orthogonal to each other. FIG. 2 is a simple structural diagram of a DDMZM. Optical carrier signals are split into two paths at input ends, and two paths of optical signals respectively pass through an upper arm and a lower arm of the Mach-Zehnder modulator. The upper arm and the lower arm of the Mach-Zehnder modulator each are a phase modulator and each are controlled by one electrode. Two paths of optical carrier signals are combined into one path of signals at an output end for coherent output. When the two paths of optical signals have a same phase, an output signal has a maximum amplitude. When the two paths of optical signals have opposite phases, an output signal has a minimum amplitude.

FIG. 3 is a schematic diagram of representation of a phase of each arm of a DDMZM on a complex number plane. This is indicated using the following formula:

$$Y_n = \exp\left(j \cdot \pi \cdot \frac{x_n \cdot V_{pp} + V_{biasn}}{V_\pi}\right).$$

Values of n are 1 and 2, respectively indicating an upper arm and a lower arm. $Y_n$ is output of a phase modulator on each arm, and is a complex number signal. $x_n$ is input of the phase modulator on each arm, $V_{pp}$ is an amplitude obtained after the input of the phase modulator is normalized, and $V_{PP}=1.5V_\pi$. $V_{biasn}$ is a bias voltage of a signal on each arm. $V_\pi$ is an intrinsic parameter of the DDMZM, and is usually a difference between a maximum value and a minimum value of an output amplitude of the DDMZM. In this way, output of the entire DDMZM may be indicated as follows:

$$Y = \sum_{n=1}^{2} Y_n = \exp\left(j \cdot \pi \cdot \frac{x_1 \cdot V_{pp} + V_{bias1}}{V_\pi}\right) + \exp\left(j \cdot \pi \cdot \frac{-x_2 \cdot V_{pp} + V_{bias2}}{V_\pi}\right).$$

The IQMZM has a congenital advantage of double spectral efficiency over 4 pulse amplitude modulation (4 PAM) commonly used in short-distance metropolitan area transmission. However, in the short-distance metropolitan area transmission, transmission costs are a factor that needs to be considered. Costs of the IQMZM are excessively high, thereby affecting practicality of the IQMZM. At a current technical stage, the DDMZM has a great cost advantage over the IQMZM. If the DDMZM can be used to replace the IQMZM, great costs can be reduced.

However, it should be noted that, it is relatively easy to generate a modulation signal in a 16 QAM format in the IQMZM, but there are many problems in generating the modulation signal in the 16 QAM format in the DDMZM. In this way, a method for simply and effectively generating the modulation signal in the 16 QAM format in the DDMZM is particularly important.

In a related technology, two 16 PAM signals are used to drive the upper arm and the lower arm of the DDMZM. A complex plane modulation diagram of the upper arm is shown in FIG. 4, and a complex plane modulation diagram of the lower arm is shown in FIG. 5. In the technology, a signal is usually modulated at a null point, to be specific, a bias voltage of a modulator is $2V_\pi \cdot N$, where N is an integer. In this case, power occupied by an optical carrier signal is suppressed to a minimum, and this means that theoretical output signal power occupies 100% of total power, and modulation efficiency reaches a maximum.

Although in the technology, the modulation signal in the 16 QAM format can be successfully generated, a signal amplitude required by the technology is $1.9V_\pi$. In addition, because a 16-level drive signal is used in the technology, interference between signals may be very serious in a transmission process. It can be clearly seen from an eye diagram shown in FIG. 6 that a size of an "eye" is very small, and crosstalk between signals is very obvious.

SUMMARY

Embodiments of this disclosure provide a signal generation method and an electronic device, to resolve a problem of signal crosstalk. Technical solutions are as follows.

According to a first aspect, a signal generation method is provided, where the method includes normalizing an I path of four-level signals and a Q path of four-level signals to obtain a normalized I path of four-level signals and a normalized Q path of four-level signals, mapping the normalized I path of four-level signals and the normalized Q path of four-level signals based on a normalization coefficient to obtain two paths of six-level signals, where the normalization coefficient is determined based on an actual value of a first path of level signals and a maximum value of the first path of level signals, and the first path of level signals are any path of level signals in the I path of four-level signals and the Q path of four-level signals, performing digital-to-analog conversion on the two paths of six-level signals to obtain converted signals, adjusting amplitudes of the converted signals to a preset amplitude, where the preset amplitude is less than a target amplitude, and the target amplitude is determined by a signal amplitude required when a 16-level signal drives a DDMZM, and loading amplitude-adjusted signals to an upper arm and a lower arm of the DDMZM to generate modulation signals.

In the signal generation method, an output four-level signal is converted into a six-level signal such that a requirement for driving the DDMZM to generate 16 QAM is met. In addition, a signal amplitude required to drive the DDMZM is reduced from $1.9V_\pi$ to $1.275V_\pi$. In this way, the following two beneficial effects are achieved.

First, a quantity of levels of a drive signal is reduced such that a signal-to-noise ratio requirement of a transmit end is reduced, crosstalk between signals is very small because there are a relatively small quantity of level signals, and clear eyes can be obtained from an eye diagram. In this way, a 16 QAM signal can also be successfully modulated even quality of an original signal at an input end is relatively poor.

Second, an amplitude requirement for the drive signal is greatly reduced such that both power consumption pressure of a system and signal generation difficulty are reduced, and system performance is improved.

In a possible design, the I path of four-level signals and the Q path of four-level signals are signals obtained through Gray mapping, to improve data reliability of the signals.

In a possible design, the preset amplitude is $1.275V_\pi$, and $V_\pi$ is a difference between a maximum value and a minimum value of an output signal amplitude of the DDMZM. Selection of the amplitude can reduce the amplitude requirement for the drive signal and obtain better signal quality.

In a possible design, mapping the normalized I path of four-level signals and the normalized Q path of four-level signals based on a normalization coefficient to obtain two paths of six-level signals includes setting a level value of the I path of signals in the normalized I path of four-level signals and the normalized Q path of four-level signals as a real part of a complex number, setting a level value of the Q path of signals in the normalized I path of four-level signals and the normalized Q path of four-level signals as an imaginary part of the complex number, and processing the normalized I path of four-level signals and the normalized Q path of four-level signals based on the real part and the imaginary part of the complex number and the normalization coefficient to obtain the two paths of six-level signals; or in another possible design, setting a level value of the Q path of signals in the normalized I path of four-level signals and the normalized Q path of four-level signals as a real part of a complex number, setting a level value of the I path of signals in the normalized I path of four-level signals and the normalized Q path of four-level signals as an imaginary part of the complex number, and processing the normalized I path of four-level signals and the normalized Q path of four-level signals based on the real part and the imaginary part of the complex number and the normalization coefficient to obtain the two paths of six-level signals.

During processing, the normalized I path of four-level signals and the normalized Q path of four-level signals may be processed using the following formulas to obtain the two paths of six-level signals:

$$x=(-1-adj)\cdot(sig==-1a+ja)+(3-adj)\cdot(sig==1a+ja)+\\(1+adj)\cdot(sig==1a-ja)+(-3+adj)\cdot(sig==-1a-ja)+\\(1+adj)\cdot(sig==-3a+3ja)+(5+adj)\cdot(sig==3a+\\3ja)+(-5-adj)\cdot(sig==3a-3ja)+(-1-adj)\cdot(sig==-\\3a-3ja)+(1+adj)\cdot(sig==-1a+3ja)+(3-adj)\cdot\\(sig==1a+3ja)+(-3+adj)\cdot(sig==1a-3ja)+(-1-\\adj)\cdot(sig==-1a-3ja)+(5+adj)\cdot(sig==3a+ja)+(-\\1-adj)\cdot(sig==3a+ja)+(-5-adj)\cdot(sig==3a-ja)+\\(1+adj)\cdot(sig==-3a-ja),\text{ and}$$

$$y=(3-adj)\cdot(sig==-1a+ja)+(-1-adj)\cdot(sig==1a+ja)+(-\\3+adj)\cdot(sig==1a-ja)+(1+adj)\cdot(sig==-1a-ja)+\\(5+adj)\cdot(sig==-3a+3ja)+(1+adj)\cdot(sig==3a+\\3ja)+(-1-adj)\cdot(sig==3a-3ja)+(-5-adj)\cdot(sig==-\\3a-3ja)+(3-adj)\cdot(sig==-1a+3ja)+(1-adj)\cdot\\(sig==1a+3ja)+(-1-adj)\cdot(sig==1a-3ja)+(-3-\\adj)\cdot(sig==-1a-3ja)+(-1-adj)\cdot(sig==3a+ja)+(-\\5+adj)\cdot(sig==3a+ja)+(1+adj)\cdot(sig==3a-ja)+(-\\5+adj)\cdot(sig==-3a-ja),$$

where sig is the complex number, a is the normalization coefficient, a == operation is a comparison operation, and an operation rule includes when values on both sides of a symbol are equal, an operation result is 1, and when values on both sides of the symbol == are unequal, an operation result is 0, and adj is a fine adjustment parameter.

When the I path of signals are used as the real part of the imaginary number and the Q path of signals are used as the imaginary part of the imaginary number, in the foregoing formulas, x is a signal output after the I path of signals are calculated using a formula, and y is a signal output after the Q path of signals are calculated using a formula.

When the Q path of signals are used as the real part of the imaginary number and the I path of signals are used as the imaginary part of the imaginary number, in the foregoing formulas, x is a signal output after the Q path of signals are calculated using a formula, and is a signal output after the I path of signals are calculated using a formula.

According to a second aspect, an electronic device is provided, where the electronic device includes a normalization module, a mapping module, two digital-to-analog converters (DACs), an amplitude adjustment module, and a DDMZM.

Two output ends of the normalization module are connected to two input ends of the mapping module, two output ends of the mapping module are respectively connected to input ends of the two DACs, output ends of the two DACs are connected to two input ends of the amplitude adjustment module, and two output ends of the amplitude adjustment module are connected to an upper arm and a lower arm of the DDMZM.

The normalization module receives an I path of four-level signals and a Q path of four-level signals, normalizes the I path of four-level signals and the Q path of four-level signals, and outputs normalized an I path of four-level signals and a Q path of four-level signals to the mapping module. The mapping module maps the normalized I path of four-level signals and the normalized Q path of four-level signals based on a normalization coefficient, and outputs two paths of six-level signals to the DAC module, where the normalization coefficient is determined based on an actual value of a first path of level signals and a maximum value of the first path of level signals, and the first path of level signals are any path of level signals in the I path of four-level signals and the Q path of four-level signals. The two DACs perform digital-to-analog conversion on the two paths of six-level signals to obtain converted signals. The amplitude adjustment module adjusts amplitudes of the converted signals to a preset amplitude, where the preset amplitude is less than a target amplitude, and the target amplitude is determined by a signal amplitude required when a 16-level signal drives a DDMZM. The amplitude adjustment module loads amplitude-adjusted signals to an upper arm and a lower arm of the DDMZM to generate modulation signals. The electronic device further includes other components configured to implement functions in the first aspect.

DESCRIPTION OF EMBODIMENTS

To make the objectives, technical solutions, and advantages of this disclosure clearer, the following further describes the implementations of this disclosure in detail with reference to the accompanying drawings.

Figure 1:
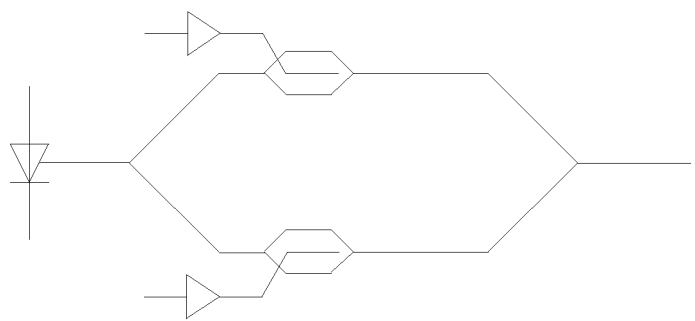
FIG. 1 is a simple structural diagram of a typical IQMZM.
Figure 2:
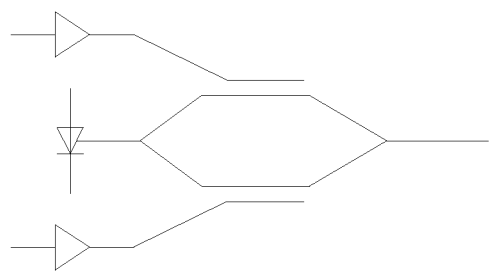
FIG. 2 is a simple structural diagram of a typical DDMZM.
Figure 3:
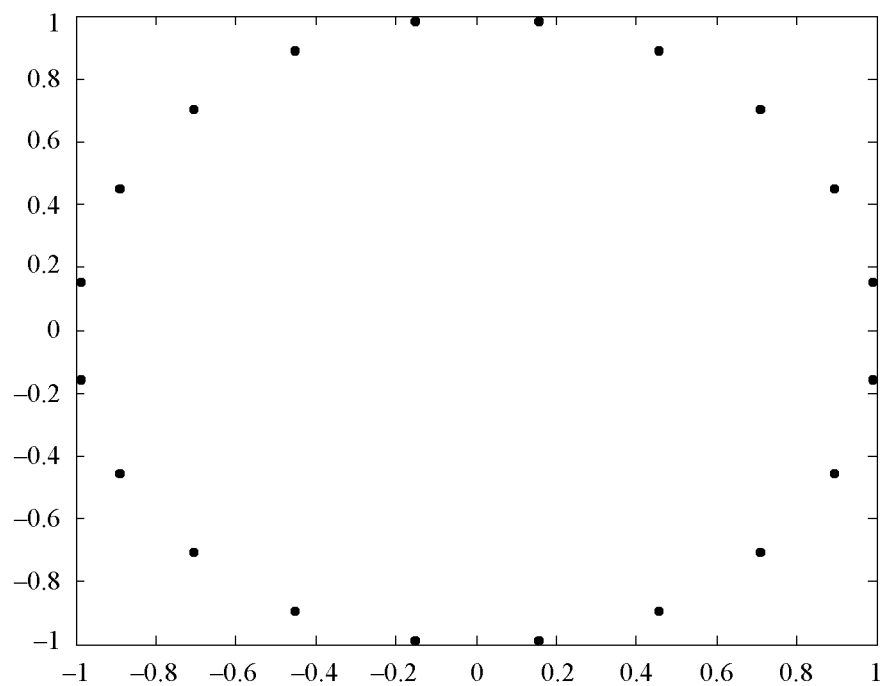
FIG. 3 is a schematic diagram of representation of a phase of each arm of a DDMZM on a complex number plane.
Figure 4:
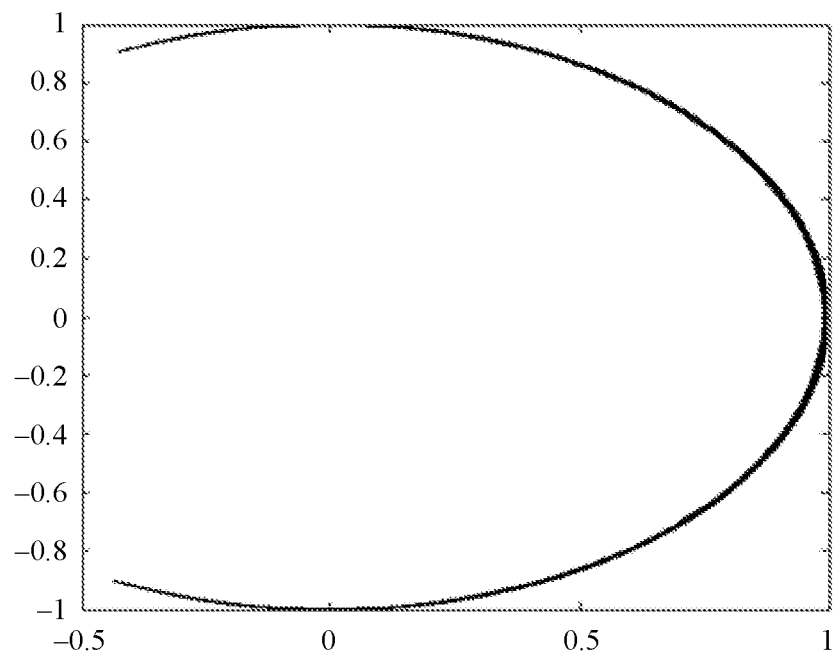
FIG. 4 is a complex plane modulation diagram of an upper arm of a DDMZM.
Figure 5:
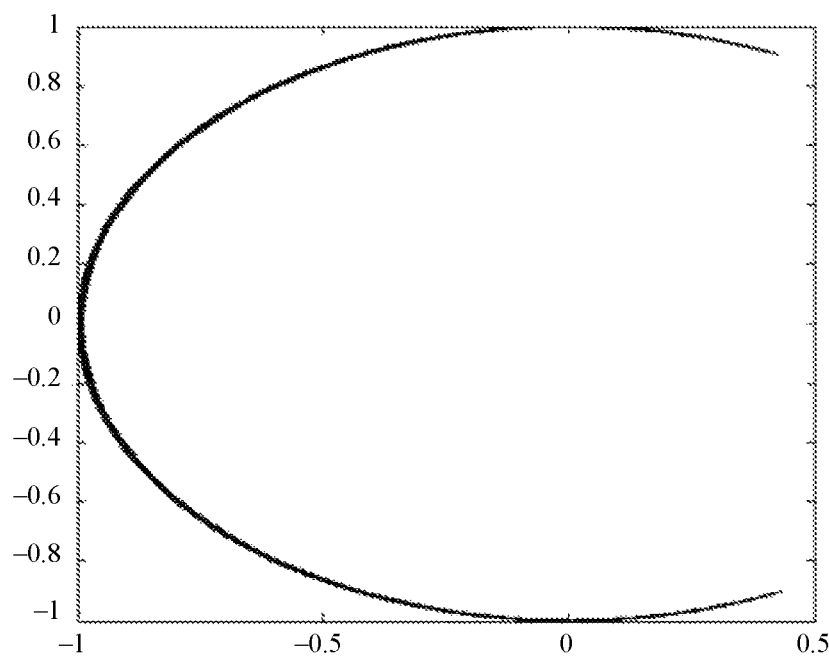
FIG. 5 is a complex plane modulation diagram of a lower arm of a DDMZM.
Figure 6:
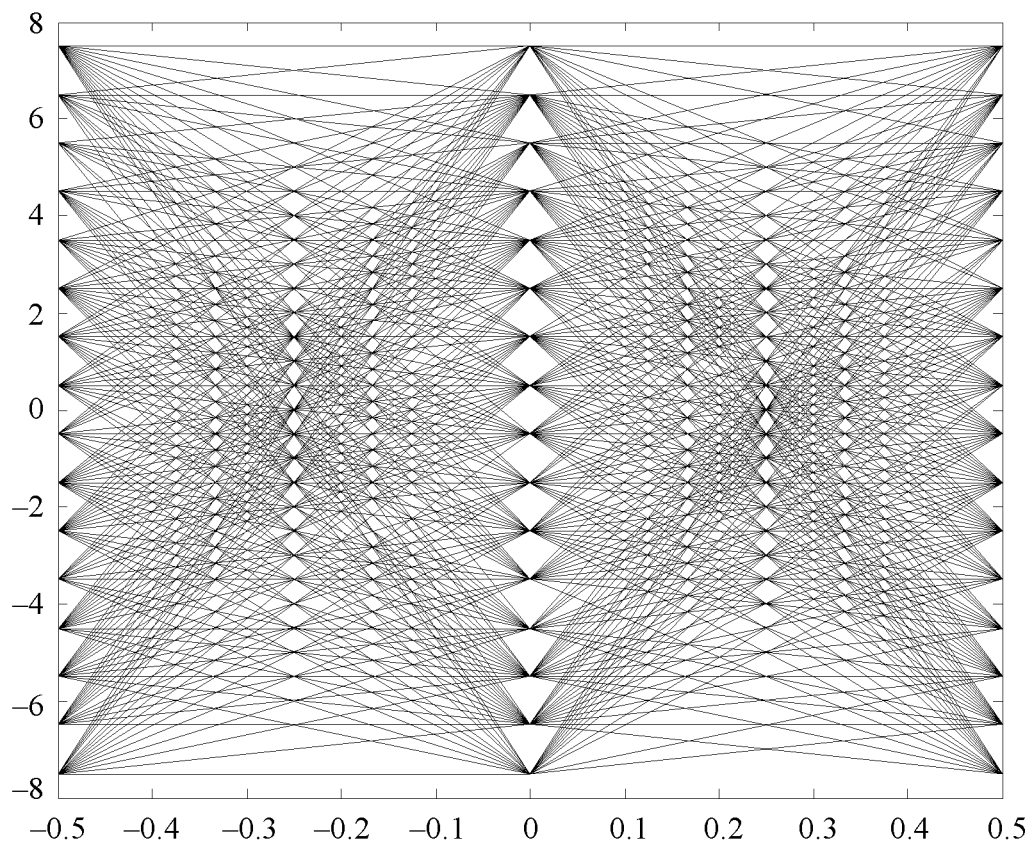
FIG. 6 is an eye diagram of a signal generated through modulation based on a 16-level drive signal.
Figure 7:
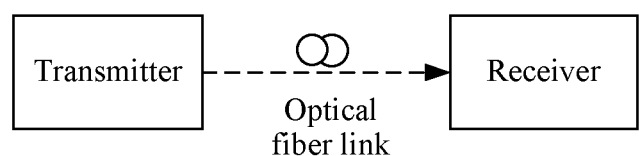
FIG. 7 is a schematic system diagram of an optical fiber communications system.

FIG. 7 is a schematic system diagram of an optical fiber communications system. The optical fiber communications system may include a transmitter and a receiver, and an optical fiber link configured to transmit a signal between the transmitter and the receiver. On a transmitter side, an electrical transmit end device may be further included, and the electrical transmit end device may provide a digital signal. The transmitter may receive the digital signal from the electrical transmit end device, perform channel coding, modulation, and the like on the digital signal to obtain an optical signal, and transmit the optical signal to the receiver through the optical fiber link.

Figure 8:
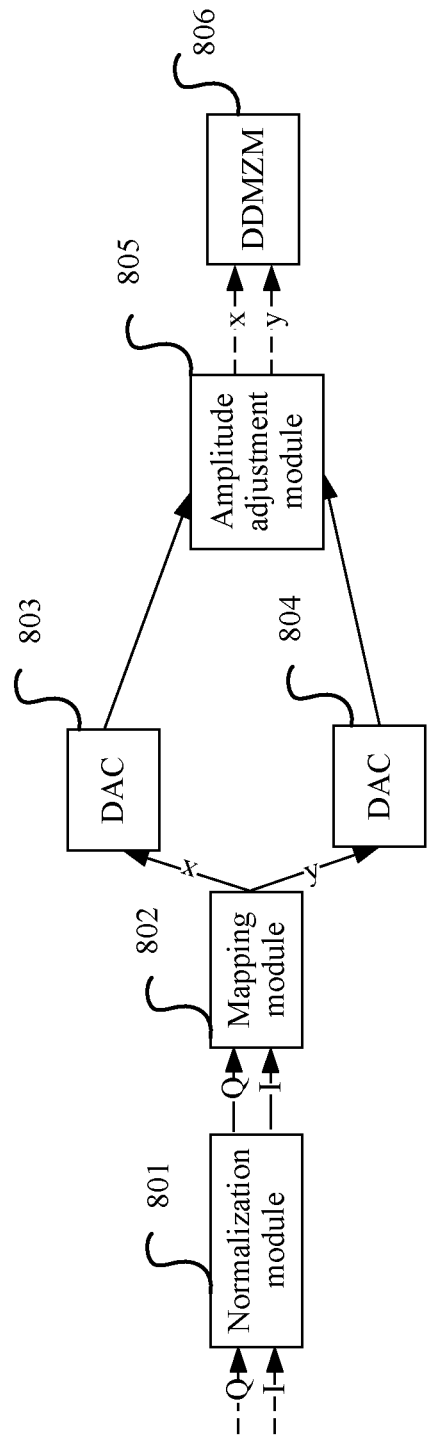
FIG. 8 is a schematic structural diagram of an electronic device according to another embodiment of this disclosure.

FIG. 8 is a schematic structural diagram of an electronic device according to another embodiment of this disclosure. Referring to FIG. 8, the electronic device includes a normalization module 801, a mapping module 802, two DACs, DAC 803 and DAC 804, an amplitude adjustment module 805, and a DDMZM 806.

Two output ends of the normalization module 801 are connected to two input ends of the mapping module 802, two output ends of the mapping module 802 are respectively connected to input ends of the two DACs, DAC 803 and DAC 804, output ends of the two DACs, DAC 803 and DAC 804, are connected to two input ends of the amplitude adjustment module 805, and two output ends of the amplitude adjustment module 805 are connected to an upper arm and a lower arm of the DDMZM 806.

The normalization module 801 receives an I path of four-level signals and a Q path of four-level signals, normalizes the I path of four-level signals and the Q path of four-level signals, and outputs a normalized I path of four-level signals and a normalized Q path of four-level signals to the mapping module 802.

The mapping module 802 maps the normalized I path of four-level signals and the normalized Q path of four-level signals based on a normalization coefficient, and outputs two paths of six-level signals to the DAC module, where the normalization coefficient is determined based on an actual value of a first path of level signals and a maximum value of the first path of level signals, and the first path of level signals are any path of level signals in the I path of four-level signals and the Q path of four-level signals. The DAC 803 and the DAC 804 are respectively configured to perform digital-to-analog conversion on the two paths of six-level signals to obtain converted signals. The amplitude adjustment module 805 adjusts amplitudes of the converted signals to a preset amplitude, where the preset amplitude is less than a target amplitude, and the target amplitude is determined by a signal amplitude required when a 16-level signal drives a DDMZM. The amplitude adjustment module 805 loads amplitude-adjusted signals to an upper arm and a lower arm of the DDMZM 806 to generate modulation signals.

Figure 9:
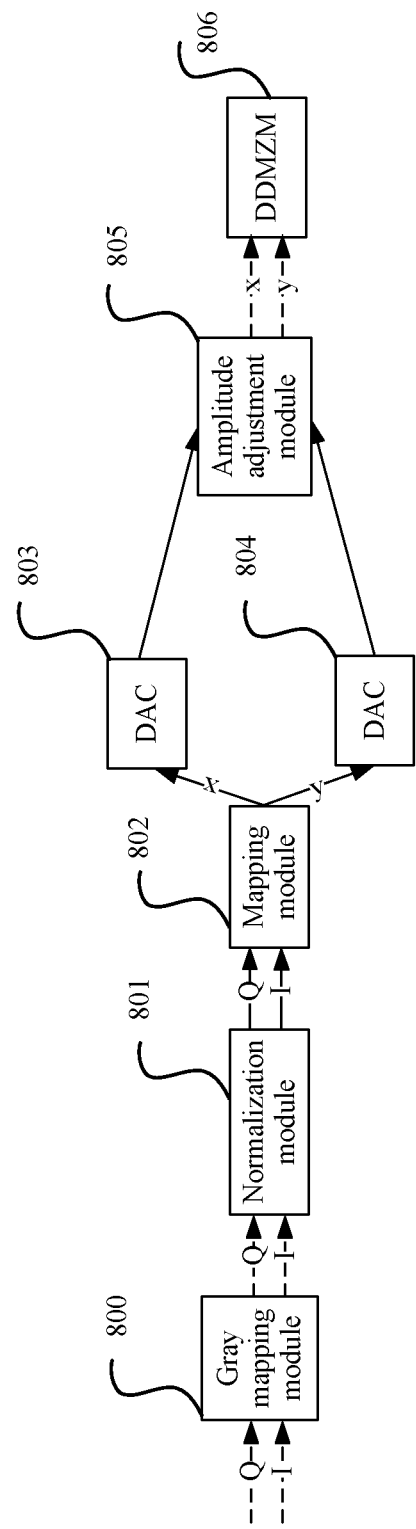
FIG. 9 is a schematic structural diagram of another electronic device according to another embodiment of this disclosure.

In a possible design, referring to FIG. 9, a Gray mapping module 800 may further be connected to an input end of the normalization module 801, and is configured to perform Gray mapping on the original I path of four-level signals and Q path of four-level signals, and output a Gray-mapped I path of four-level signals and Q path of four-level signals to the normalization module 801.

In a possible design, the mapping module 802 includes a first complex number obtaining unit and a first calculation processing unit, and an output end of the first complex number obtaining unit is connected to an input end of the first calculation processing unit.

The first complex number obtaining unit uses a level value of the I path of signals in the normalized I path of four-level signals and the normalized Q path of four-level signals as a real part of a complex number, uses a level value of the Q path of signals in the normalized I path of four-level signals and the normalized Q path of four-level signals as an imaginary part of the complex number to obtain the complex number corresponding to the normalized I path of four-level signals and the normalized Q path of four-level signals, and outputs the complex number to the first calculation processing unit.

The first calculation processing unit processes the normalized I path of four-level signals and the normalized Q path of four-level signals based on the real part and the imaginary part of the complex number and the normalization coefficient to obtain the two paths of six-level signals.

In a possible design, the first calculation processing unit is configured to process the normalized I path of four-level signals and the normalized Q path of four-level signals based on the following formulas to obtain the two paths of six-level signals:

$$x=(-1-adj)\cdot(sig==-1a+ja)+(3-adj)\cdot(sig==1a+ja)+\\(1+adj)\cdot(sig==1a-ja)+(-3+adj)\cdot(sig==-1a-ja)+\\(1+adj)\cdot(sig==-3a+3ja)+(5+adj)\cdot(sig==3a+3ja)+(-5-adj)\cdot(sig==3a-3ja)+(-1-adj)\cdot(sig==-3a-3ja)+(1+adj)\cdot(sig==-1a+3ja)+(3-adj)\cdot(sig==1a+3ja)+(-3+adj)\cdot(sig==1a-3ja)+(-1-$$

$adj)\cdot(sig==-1a-3ja)+(5+adj)\cdot(sig==3a+ja)+(-1-adj)\cdot(sig==3a+ja)+(-5-adj)\cdot(sig==3a-ja)+(1+adj)\cdot(sig==-3a-ja)$, and $y=(3-adj)\cdot(sig==-1a+ja)+(-1-adj)\cdot(sig==1a+ja)+(-3+adj)\cdot(sig==1a-ja)+(1+adj)\cdot(sig==-1a-ja)+(5+adj)\cdot(sig==-3a+3ja)+(1+adj)\cdot(sig==3a+3ja)+(-1-adj)\cdot(sig==3a-3ja)+(-5-adj)\cdot(sig==-3a-3ja)+(3-adj)\cdot(sig==-1a+3ja)+(1-adj)\cdot(sig==1a+3ja)+(-1-adj)\cdot(sig==1a-3ja)+(-3-adj)\cdot(sig==-1a-3ja)+(-1-adj)\cdot(sig==3a+ja)+(5+adj)\cdot(sig==3a+ja)+(1+adj)\cdot(sig==3a-ja)+(-5+adj)\cdot(sig==-3a-ja)$, where sig is the complex number, a is the normalization coefficient, a == operation is a comparison operation, and an operation rule includes when values on both sides of a symbol == are equal, an operation result is 1, and when values on both sides of the symbol == are unequal, an operation result is 0, adj is a fine adjustment parameter, x is a signal output after the I path of signals are calculated using a formula, and v is a signal output after the Q path of signals are calculated using a formula.

In a possible design, the mapping module 802 includes a second complex number obtaining unit and a second calculation processing unit, and an output end of the second complex number obtaining unit is connected to an input end of the second calculation processing unit.

The second complex number obtaining unit uses a level value of the Q path of signals in the normalized I path of four-level signals and the normalized Q path of four-level signals as a real part of a complex number, uses a level value of the I path of signals in the normalized I path of four-level signals and the normalized Q path of four-level signals as an imaginary part of the complex number to obtain the complex number corresponding to the normalized I path of four-level signals and the normalized Q path of four-level signals, and outputs the complex number to the second calculation processing unit.

The second calculation processing unit processes the normalized I path of four-level signals and the normalized Q path of four-level signals based on the real part and the imaginary part of the complex number and the normalization coefficient to obtain the two paths of six-level signals.

In a possible design, the second calculation processing unit is configured to process the normalized I path of four-level signals and the Q path of four-level signals based on the following formulas to obtain the two paths of six-level signals:

$x=(-1-adj)\cdot(sig==-1a+ja)+(3-adj)\cdot(sig==1a+ja)+(1+adj)\cdot(sig==1a-ja)+(-3+adj)\cdot(sig==-1a-ja)+(1+adj)\cdot(sig==-3a+3ja)+(5+adj)\cdot(sig==3a+3ja)+(-5-adj)\cdot(sig==3a-3ja)+(-1-adj)\cdot(sig==-3a-3ja)+(1+adj)\cdot(sig==-1a+3ja)+(3-adj)\cdot(sig==1a+3ja)+(-3+adj)\cdot(sig==1a-3ja)+(-1-adj)\cdot(sig==-1a-3ja)+(5+adj)\cdot(sig==3a+ja)+(-1-adj)\cdot(sig==3a+ja)+(-5-adj)\cdot(sig==3a-ja)+(1+adj)\cdot(sig==-3a-ja)$, and $y=(3-adj)\cdot(sig==-1a+ja)+(-1-adj)\cdot(sig==1a+ja)+(-3+adj)\cdot(sig==1a-ja)+(1+adj)\cdot(sig==-1a-ja)+(5+adj)\cdot(sig==-3a+3ja)+(1+adj)\cdot(sig==3a+3ja)+(-1-adj)\cdot(sig==3a-3ja)+(-5-adj)\cdot(sig==-3a-3ja)+(3-adj)\cdot(sig==-1a+3ja)+(1-adj)\cdot(sig==1a+3ja)+(-1-adj)\cdot(sig==1a-3ja)+(-3-adj)\cdot(sig==-1a-3ja)+(-1-adj)\cdot(sig==3a+ja)+(5+adj)\cdot(sig==3a+ja)+(1+adj)\cdot(sig==3a-ja)+(-5+adj)\cdot(sig==-3a-ja)$, where sig is the complex number, a is the normalization coefficient, a == operation is a comparison operation, and an operation rule includes when values on both sides of a symbol == are equal, an operation result is 1, and when values on both sides of the symbol == are unequal, an operation result is 0, adj is a fine adjustment parameter, x is a signal output after the Q path of signals are calculated using a formula, and y is a signal output after the I path of signals are calculated using a formula.

Figure 10:
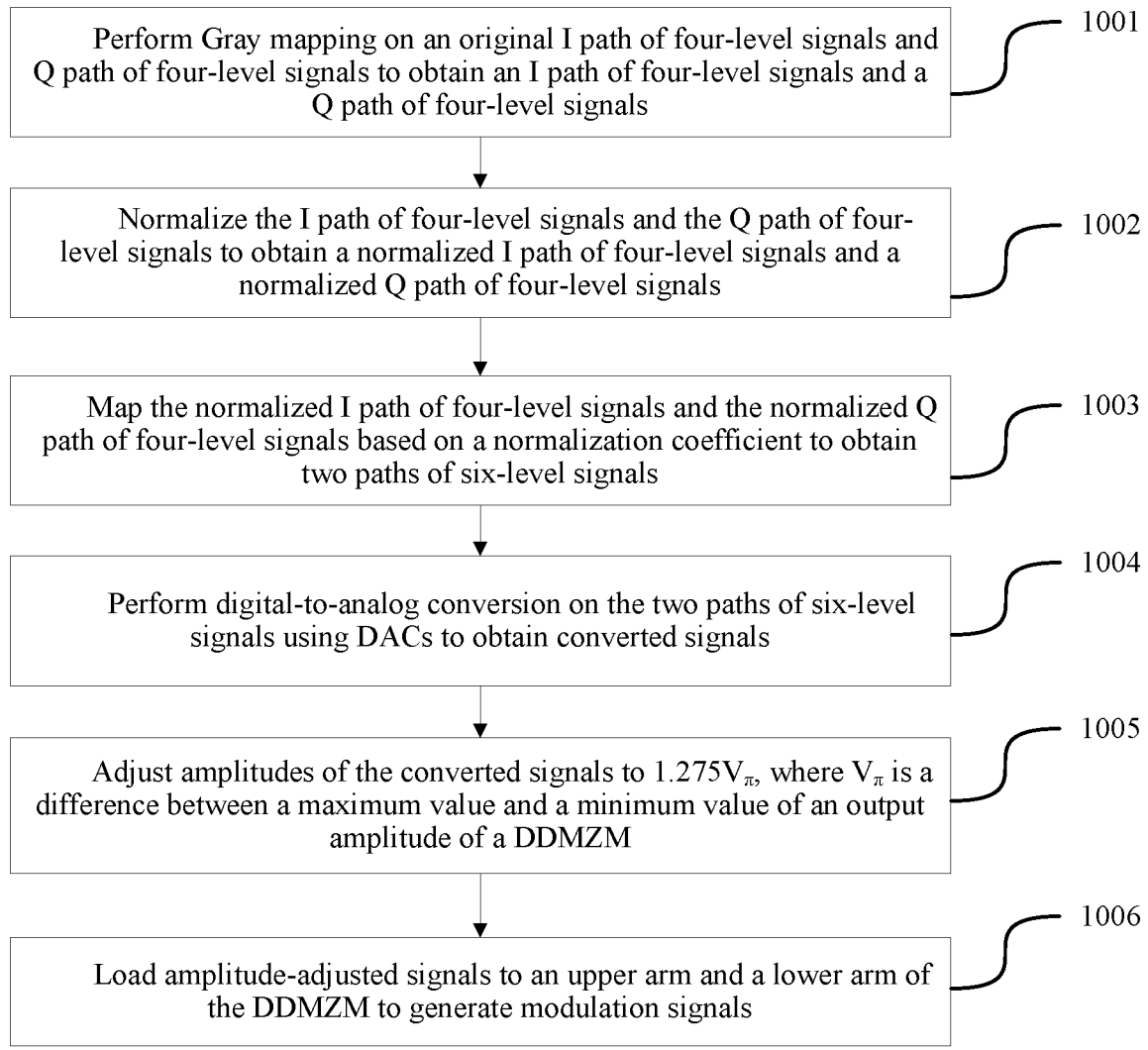
FIG. 10 is a flowchart of a signal generation method according to an embodiment of this disclosure.

FIG. 10 is a flowchart of a signal generation method according to an embodiment of this disclosure. The signal generation method may be performed by an electronic device. Referring to FIG. 10, the method includes the following steps.

Step 1001. Perform Gray mapping on an original I path of four-level signals and Q path of four-level signals to obtain an I path of four-level signals and a Q path of four-level signals.

The I path of four-level signals and the Q path of four-level signals may be quadrature signals that are generated by a signal source component of a transmitter and whose phase difference is 90 degrees. A signal input end is connected to an input end of a Gray mapping module, the I path of four-level signals and the Q path of four-level signals are input to the Gray mapping module for Gray mapping, and the I path of four-level signals and the Q path of four-level signals are output through two output ends of the Gray mapping module. The Gray mapping is a data conversion manner. In a Gray mapping process, Gray coding conversion is performed on original signal data, and adjacent numbers differ by only one bit in signals obtained after the Gray coding conversion. In cases of a signal transmission loss, attenuation, noise interference, signal crosstalk, and the like, only one bit of data is lost each time one number is lost. In this way, even if a bit error, a data packet loss, or a loss occurs in a data transmission process, data obtained through Gray coding mapping conversion can also ensure a minimum loss rate of the data.

Certainly, in this embodiment of this disclosure, alternatively, the Gray mapping may not be performed, but normalization processing in step 1002 is directly performed to reduce a transmitter component such that processing efficiency in a signal transmission process can be improved.

Step 1002. Normalize the I path of four-level signals and the Q path of four-level signals to obtain a normalized I path of four-level signals and a normalized Q path of four-level signals.

An output end of the Gray mapping module is connected to an input end of a normalization module. After the Gray mapping, the Gray mapping module outputs the I path of four-level signals and the Q path of four-level signals to the normalization module for normalization processing. After the normalization processing, levels of the I path of four-level signals and the Q path of four-level signals are adjusted to four levels: [−3a, −1a, 1a, 3a] for output. In a normalization process, a normalization coefficient may be determined. To be specific, the normalization coefficient is determined based on an actual value of a first path of level signals and a maximum value of the first path of level signals, and the first path of level signals are any path of level signals in the I path of four-level signals and the Q path of four-level signals.

The normalization process is a mathematical conversion process, and the following formula (1) and formula (2) may be used in a specific conversion process:

$$I' = \frac{I}{\max(I)} 3a, \text{ and} \quad (1)$$

-continued $$Q' = \frac{Q}{\max(Q)} 3a, \qquad (2)$$

where max(I) is a maximum level value of the I path of signals, max(Q) is a maximum level value of the Q path of signals, I' is a level value of a normalized I path of signals output in real time, Q' is a level value of a normalized Q path of signals output in real time, and a is the normalization coefficient.

Step 1003. Map the normalized I path of four-level signals and the normalized Q path of four-level signals based on a normalization coefficient to obtain two paths of six-level signals.

Two output ends of the normalization module are connected to two input ends of a mapping module. The mapping module maps the I path of four-level signals and the Q path of four-level signals obtained after the normalization processing, and outputs the two paths of six-level signals. A mapping process is performed based on the normalization coefficient, and may further include the following process.

First, a complex number corresponding to the I path of four-level signals and the Q path of four-level signals is generated based on the input I path of four-level signals and Q path of four-level signals.

In a possible design, an input level value of the I path of signals at a particular moment is used as a real part of the complex number, and an input level value of the Q path of signals at the same moment is used as an imaginary part of the complex number to construct the complex number that includes values of the I path of four-level signals and the Q path of four-level signals based on the moment. Further, the complex number is indicated using a formula: sig=I+jQ, and sig is the complex number corresponding to the I path of four-level signals and the Q path of four-level signals at the particular moment.

In another possible design, an input level value of the Q path of signals at a particular moment is used as a real part of the complex number, and an input level value of the I path of signals at the same moment is used as an imaginary part of the complex number, to construct the complex number that includes values of the I path of four-level signals and the Q path of four-level signals based on the moment. Further, the complex number is indicated using a formula: sig=Q+jI, and sig is the complex number corresponding to the I path of four-level signals and the Q path of four-level signals at the particular moment.

In a conventional method for generating a modulation signal in a 16 QAM format, signals in the 16 QAM format are mapped on a complex plane to generate a constellation diagram. When moduli of signals corresponding to points on four vertex angles in the constellation diagram are a possible maximum modulation amplitude of a DDMZM, 16 level values are required by drive signals for an upper arm and a lower arm of the DDMZM. Therefore, a 16-level input signal is used to drive the DDMZM to generate the modulation signal in the 16 QAM format. When a modulus of each point in the constellation diagram is reduced, that is, when a modulation amplitude of a signal is reduced, a quantity of 16 level values required by the drive signal is reduced, and sizes of 16 level values even overlap. 16 levels may be reduced to six levels in a process of reducing an amplitude of the modulation signal. This is a feasible method for generating the modulation signal in the 16 QAM format using fewer than 16 levels. Based on this phenomenon, this disclosure proposes a conversion formula for converting four levels to six levels, and the normalized I path of four-level signals and the normalized Q path of four-level signals may be processed based on the real part and the imaginary part of the complex number and the normalization coefficient using the conversion formula, to obtain the two paths of six-level signals, and further drive, using a six-level signal, the DDMZM to generate the modulation signal in the 16 QAM format.

The foregoing process is further indicated using the following formula (3) and formula (4):

$$\begin{aligned}x=&(-1-adj)\cdot(sig==-1a+ja)+(3-adj)\cdot(sig==1a+ja)+\\&(1+adj)\cdot(sig==1a-ja)+(-3+adj)\cdot(sig==-1a-ja)+\\&(1+adj)\cdot(sig==-3a+3ja)+(5+adj)\cdot(sig==3a+3ja)+\\&(-5-adj)\cdot(sig==3a-3ja)+(-1-adj)\cdot(sig==-3a-3ja)+\\&(1+adj)\cdot(sig==-1a+3ja)+(3-adj)\cdot(sig==1a+3ja)+\\&(-1-adj)\cdot(sig==1a-3ja)+(-3+adj)\cdot(sig==-1a-3ja)+\\&(5+adj)\cdot(sig==3a+ja)+(-1-adj)\cdot(sig==3a+ja)+\\&(-5-adj)\cdot(sig==3a-ja)+(1+adj)\cdot(sig==-3a-ja),\text{ and}\end{aligned} \qquad (3)$$

$$\begin{aligned}y=&(3-adj)\cdot(sig==-1a+ja)+(-1-adj)\cdot(sig==1a+ja)+\\&(-3+adj)\cdot(sig==1a-ja)+(1+adj)\cdot(sig==-1a-ja)+\\&(5+adj)\cdot(sig==-3a+3ja)+(1+adj)\cdot(sig==3a+3ja)+\\&(-1-adj)\cdot(sig==3a-3ja)+(-5-adj)\cdot(sig==-3a-3ja)+\\&(3-adj)\cdot(sig==-1a+3ja)+(1-adj)\cdot(sig==1a+3ja)+(-1-adj)\cdot(sig==1a-3ja)+(-3-adj)\cdot(sig==-1a-3ja)+(-1-adj)\cdot(sig==3a+ja)+\\&(-5+adj)\cdot(sig==3a+ja)+(1+adj)\cdot(sig==3a-ja)+(-5+adj)\cdot(sig==-3a-ja).\end{aligned} \qquad (4)$$

In the formulas, sig. is the complex number corresponding to the I paths of signals and the Q path of signals at a particular moment, a is the determined normalization coefficient, a == operation is a comparison operation, and an operation rule is: when values on both sides of a symbol == are equal, an operation result is 1, and when values on both sides of the symbol == are unequal, an operation result is 0, and adj is a fine adjustment parameter. In actual calculation, an optimal value is 0.2. x is a signal output after the I path of signals are calculated using a formula, and y is a signal output after the Q path of signals are calculated using a formula.

In another possible design, a level value of the Q path of signals in the normalized I path of four-level signals and the normalized Q path of four-level signals may be alternatively used as a real part of a complex number, a level value of the I path of signals in the normalized I path of four-level signals and the normalized Q path of four-level signals is used as an imaginary part of the complex number, and the normalized I path of four-level signals and the normalized Q path of four-level signals are processed based on the real part and the imaginary part of the complex number and the normalization coefficient, to obtain the two paths of six-level signals. In this case, the foregoing formula (3) and formula (4) may still be used for processing. However, because values of the imaginary part and the real part change, indications of parameters of the formulas change. In this possible design, x is a signal output after the Q path of signals are calculated using a formula, and y is a signal output after the I path of signals are calculated using a formula.

Figure 11:
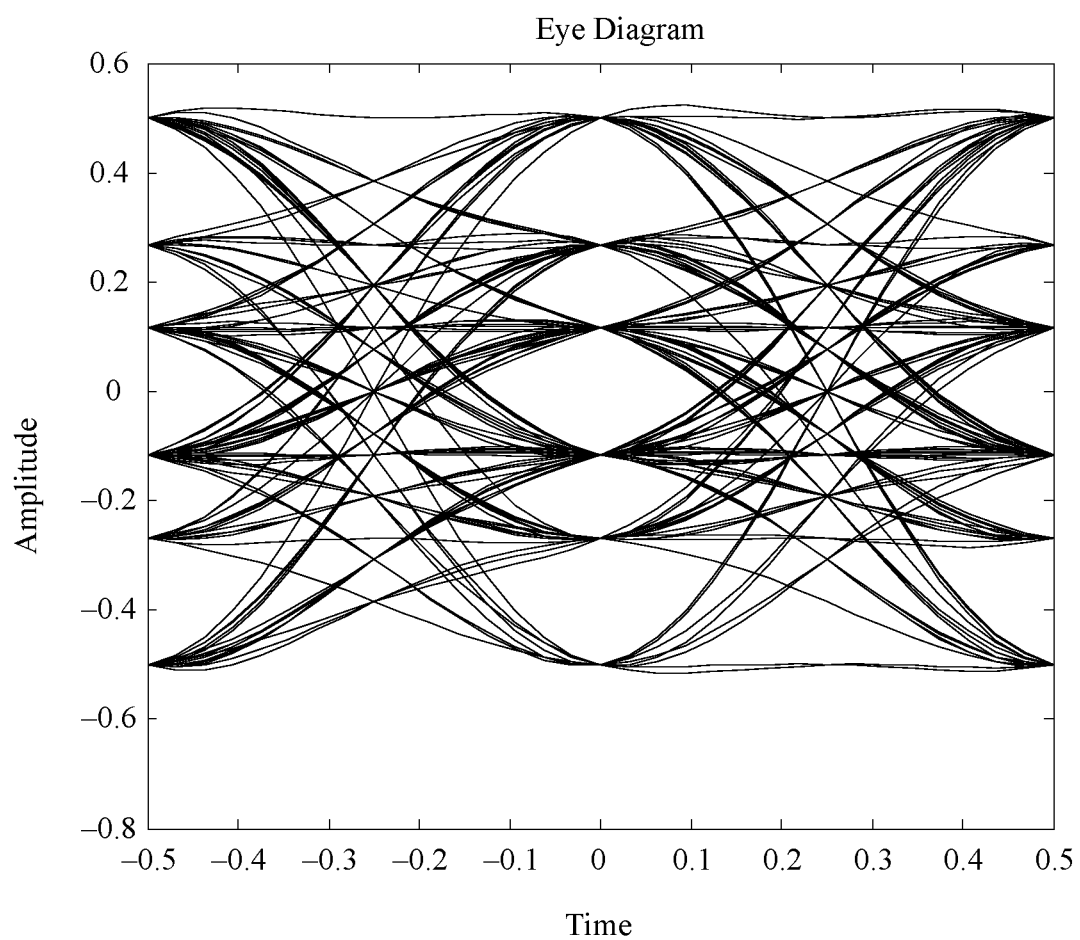
FIG. 11 is an eye diagram corresponding to an path of six-level signals and a y path of six-level signals.
Figure 12:
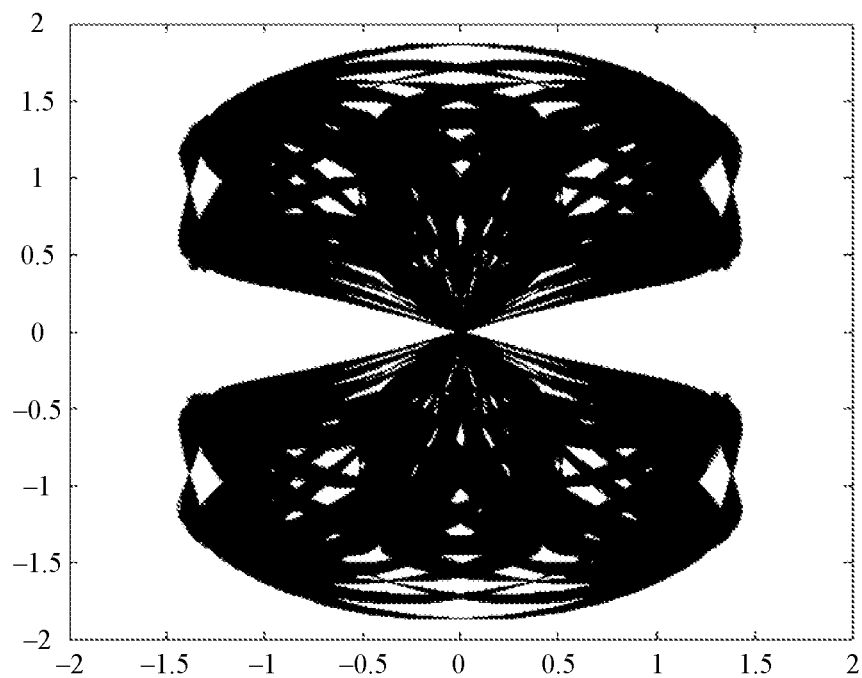
FIG. 12 is a schematic diagram of mapping of an x path of six-level signals and a y path of six-level signals on a complex plane.

It can be clearly learned from the foregoing formulas that the complex number corresponding to the I path of signals and the Q path of signals at a particular moment is a fixed value sig. In this way, for the particular moment, only one comparison operation in the foregoing formulas is equal, and has an operation result of 1, and all remaining operation results are 0. Considering impact from the fine adjustment parameter, a finally output level value is only one of −5.2a, −2.8a, −1.2a, 1.2a, 2.8a, and 5.2a. In this way, the input I path of four-level signals and Q path of four-level signals [−3a, −1a, 1a, 3a] are successively converted into an x path of six-level signals and a v path of six-level signals [−5.2a, −2.8a, −1.2a, 1.2a, 2.8a, 5.2a]. An eye diagram corresponding to the x path of six-level signals and the y path of six-level signals is shown in FIG. 11. An "eye" can be clearly seen from the eye diagram, and this means that crosstalk between signals is relatively small. Mapping of the x path of six-level signals and the y path of six-level signals on a complex plane is shown in FIG. 12.

Step 1004. Perform digital-to-analog conversion on the two paths of six-level signals using DACs to obtain converted signals.

The two output ends of the mapping module are respectively connected to input ends of the DACs, the x path of six-level signals and the v path of six-level signals [−5.2a, −2.8a, −1.2a, 1.2a, 2.8a, 5.2a] are output to the DACs for signal conversion, and an x path of digital signals and a y path of digital signals are converted to an path of analog signals and a y path of analog signals and are output.

Step 1005. Adjust amplitudes of the converted signals to $1.275V_\pi$, where $V_\pi$ is a difference between a maximum value and a minimum value of an output amplitude of a DDMZM.

Output ends of the DACs are connected to two input ends of an amplitude adjustment module. After the converted signals are input to the amplitude adjustment module, the converted signals are adjusted to $1.275V_\pi$ through amplitude adjustment and are output. In this embodiment of this disclosure, the amplitude may be adjusted to a preset amplitude, the preset amplitude is less than a target amplitude, and the target amplitude is determined by a signal amplitude required when a 16-level signal drives the DDMZM. For example, the preset amplitude is $1.275V_\pi$, and $V_\pi$ is the difference between the maximum value and the minimum value of the output amplitude of the DDMZM, that is, a voltage difference between the upper arm and the lower arm of the DDMZM when direct current light intensity of the DDMZM changes from maximum output to minimum output.

Step 1006. Load amplitude-adjusted signals to the upper arm and the lower arm of the DDMZM to generate modulation signals.

Two output ends of the amplitude adjustment module are connected to the upper arm and the lower arm of the DDMZM. After amplitudes of the x path of analog signals and the y path of analog signals are adjusted, the amplitude adjustment module respectively loads the two paths of analog signals to the upper arm and the lower arm of the DDMZM to drive the DDMZM. The upper arm and the lower arm of the DDMZM are two optical tributaries, an electro-optic polarity material is used for each optical tributary, and a refractive index of the optical tributary changes with a magnitude of an externally applied electrical signal. A change in the refractive index of the optical tributary causes a change in a signal phase. When signals of the two optical tributaries are combined at an output end again, a combined optical signal is an interference signal whose intensity varies with time, and this is equivalent to that a change in an electrical signal is converted to a change in an optical signal, thereby implementing light intensity modulation.

Figure 13:
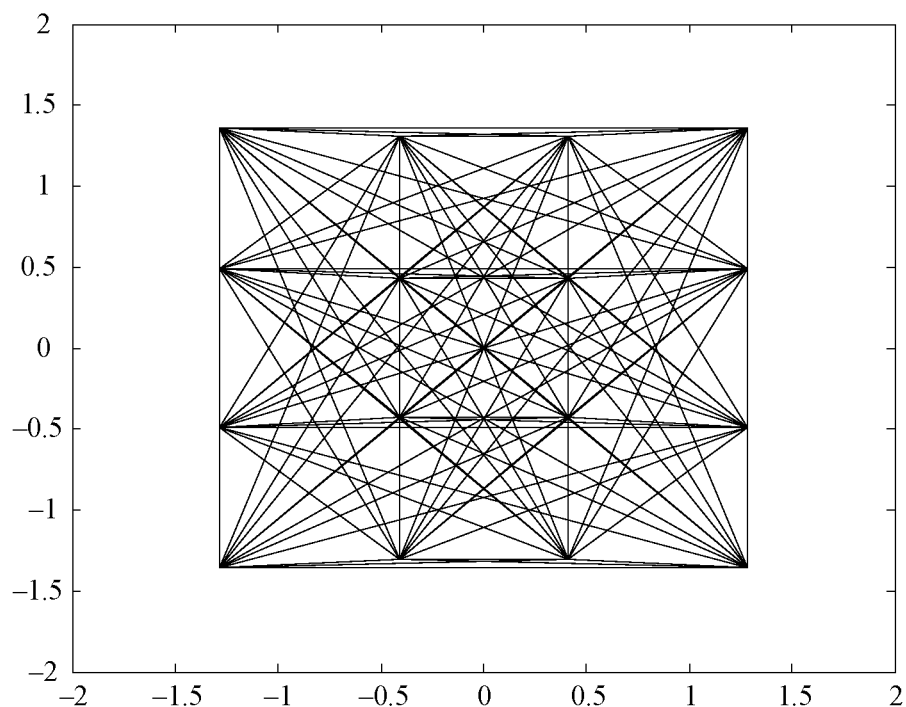
FIG. 13 is a constellation diagram of a modulation signal in a 16 QAM format output in an embodiment of this disclosure.

A modulation point of the DDMZM is set to a null point, to be specific, a bias voltage of the modulator is $2V_\pi \cdot N$, where N is a positive integer. When the DDMZM works at the null point, power occupied by a direct current light is suppressed to a minimum, that is, a carrier signal power ratio (CSPR) is suppressed to a minimum. The DDMZM generates and outputs the modulation signal in the 16 QAM format in a working process. A constellation diagram of the modulation signal in the 16 QAM format output in this embodiment of this disclosure is shown in FIG. 13.

According to the method provided in this embodiment of this disclosure, a mapping process is increased in this disclosure, to convert a four-level signal into a six-level signal such that the DDMZM is driven based on the six-level signal, thereby reducing a signal-to-noise ratio requirement of an input signal, improving a noise resistance capability of a transmit end, reducing impact from crosstalk between signals, and reducing a requirement standard on components such as the DAC and a driver. In addition, in this embodiment of this disclosure, an amplitude requirement of the drive signal is greatly reduced such that the amplitude requirement of the drive signal is reduced, and a power consumption requirement is further reduced, thereby reducing working pressure of the DDMZM, and improving overall system performance. Further, the Gray mapping may be performed on the original input I path of four-level signals and Q path of four-level signals to improve data reliability. In addition, in this embodiment of this disclosure, an amplitude of the drive signal is further reduced to $1.275V_\pi$, and the power consumption requirement is further reduced.

All the foregoing optional technical solutions may be randomly combined to form optional embodiments of this disclosure, and details are not described herein.

What is claimed is:

1. A signal generation method, comprising:
    normalizing an I path of four-level signals to obtain a normalized I path of four-level signals;
    normalizing a Q path of four-level signals to obtain a normalized Q path of four-level signals;
    determining a normalization coefficient based on an actual value of a first path of level signals and a maximum value of the first path of level signals, wherein the first path of level signals comprises any path of level signals in the I path of four-level signals and the Q path of four-level signals;
    mapping the normalized I path of four-level signals and the normalized Q path of four-level signals based on the normalization coefficient to obtain two paths of six-level signals;
    performing digital-to-analog conversion on the two paths of six-level signals to obtain converted signals;
    adjusting amplitudes of the converted signals to a preset amplitude to obtain amplitude-adjusted signals, wherein the preset amplitude is less than a target amplitude, and wherein the target amplitude is determined by a signal amplitude employed when a 16-level signal drives a dual-drive Mach-Zehnder modulator (DDMZM); and
    loading the amplitude-adjusted signals to an upper arm and a lower arm of the DDMZM to generate modulation signals.

2. The signal generation method of claim 1, wherein mapping the normalized I path of four-level signals and the normalized Q path of four-level signals further comprises:
    setting a first level value of the I path of signals in the normalized I path of four-level signals as a real part of a complex number;
    setting a second level value of the Q path of signals in the normalized Q path of four-level signals as an imaginary part of the complex number; and processing the normalized I path of four-level signals and the normalized Q path of four-level signals based on the real part and the imaginary part of the complex number and the normalization coefficient, to obtain the two paths of six-level signals.

3. The signal generation method of claim 2, wherein processing the normalized I path of four-level signals and the normalized Q path of four-level signals to obtain the two paths of six-level signals further comprises:

processing the normalized I path of four-level signals and the normalized Q path of four-level signals using the following formulas to obtain the two paths of six-level signals:

$$x=(-1-adj)\cdot(sig==-1a+ja)+(3-adj)\cdot(sig==1a+ja)+\\(1+adj)\cdot(sig==1a-ja)+(-3+adj)\cdot(sig==-1a-ja)+\\(1+adj)\cdot(sig==-3a+3ja)+(5+adj)\cdot(sig==3a+3ja)+(-5-adj)\cdot(sig==3a-3ja)+(-1-adj)\cdot(sig==-3a-3ja)+(1+adj)\cdot(sig==-1a+3ja)+(3-adj)\cdot(sig==1a+3ja)+(-3+adj)\cdot(sig==1a-3ja)+(-1-adj)\cdot(sig==-1a-3ja)+(5+adj)\cdot(sig==3a+ja)+(-1-adj)\cdot(sig==3a+ja)+(-5-adj)\cdot(sig==3a-ja)+(1+adj)\cdot(sig==-3a-ja);$$

and $$y=(3-adj)\cdot(sig==-1a+ja)+(-1-adj)\cdot(sig==1a+ja)+(-3+adj)\cdot(sig==1a-ja)+(1+adj)\cdot(sig==-1a-ja)+\\(5+adj)\cdot(sig==-3a+3ja)+(1+adj)\cdot(sig==3a+3ja)+(-1-adj)\cdot(sig==3a-3ja)+(-5-adj)\cdot(sig==-3a-3ja)+(3-adj)\cdot(sig==-1a+3ja)+(1-adj)\cdot(sig==1a+3ja)+(-1-adj)\cdot(sig==1a-3ja)+(-3-adj)\cdot(sig==-1a-3ja)+(-1-adj)\cdot(sig==3a+ja)+(-5+adj)\cdot(sig==3a+ja)+(1+adj)\cdot(sig==3a-ja)+(-5+adj)\cdot(sig==-3a-ja),$$

wherein sig is the complex number, wherein a is the normalization coefficient, wherein adj is a fine adjustment parameter, wherein x is a first signal output after the I path of signals are calculated using a first formula, wherein y is a second signal output after the Q path of signals are calculated using a second formula, wherein == is a comparison operation, and wherein a comparison operation rule comprises:

an operation result is one when values on both sides of a symbol == are equal; and the operation result is zero when the values on both sides of the symbol == are unequal.

4. The signal generation method of claim 1, wherein mapping the normalized I path of four-level signals and the normalized Q path of four-level signals to obtain the two paths of six-level signals comprises:

setting a first level value of the Q path of signals in the normalized Q path of four-level signals as a real part of a complex number;

setting a second level value of the I path of signals in the normalized I path of four-level signals as an imaginary part of the complex number; and processing the normalized I path of four-level signals and the normalized Q path of four-level signals based on the real part and the imaginary part of the complex number and the normalization coefficient, to obtain the two paths of six-level signals.

5. The signal generation method of claim 4, wherein processing the normalized I path of four-level signals and the normalized Q path of four-level signals to obtain the two paths of six-level signals comprises:

processing the normalized I path of four-level signals and the normalized Q path of four-level signals using the following formulas to obtain the two paths of six-level signals:

$$x=(-1-adj)\cdot(sig==-1a+ja)+(3-adj)\cdot(sig==1a+ja)+\\(1+adj)\cdot(sig==1a-ja)+(-3+adj)\cdot(sig==-1a-ja)+\\(1+adj)\cdot(sig==-3a+3ja)+(5+adj)\cdot(sig==3a+3ja)+(-5-adj)\cdot(sig==3a-3ja)+(-1-adj)\cdot(sig==-3a-3ja)+(1+adj)\cdot(sig==-1a+3ja)+(3-adj)\cdot(sig==1a+3ja)+(-3+adj)\cdot(sig==1a-3ja)+(-1-adj)\cdot(sig==-1a-3ja)+(5+adj)\cdot(sig==3a+ja)+(-1-adj)\cdot(sig==3a+ja)+(-5-adj)\cdot(sig==3a-ja)+(1+adj)\cdot(sig==-3a-ja);\text{ and}$$

$$y=(3-adj)\cdot(sig==-1a+ja)+(-1-adj)\cdot(sig==1a+ja)+(-3+adj)\cdot(sig==1a-ja)+(1+adj)\cdot(sig==-1a-ja)+\\(5+adj)\cdot(sig==-3a+3ja)+(1+adj)\cdot(sig==3a+3ja)+(-1-adj)\cdot(sig==3a-3ja)+(-5-adj)\cdot(sig==-3a-3ja)+(3-adj)\cdot(sig==-1a+3ja)+(1-adj)\cdot(sig==1a+3ja)+(-1-adj)\cdot(sig==1a-3ja)+(-3-adj)\cdot(sig==-1a-3ja)+(-1-adj)\cdot(sig==3a+ja)+(-5+adj)\cdot(sig==3a+ja)+(1+adj)\cdot(sig==3a-ja)+(-5+adj)\cdot(sig==-3a-ja),$$

wherein sig is the complex number, wherein a is the normalization coefficient, wherein adj is a fine adjustment parameter, wherein x is a first signal output after the Q path of signals are calculated using a first formula, wherein y is a second signal output after the Q path of signals are calculated using a second formula, wherein == is a comparison operation, and wherein a comparison operation rule comprises:

an operation result is one when values on both sides of a symbol == are equal, and the operation result is zero when the values on both sides of the symbol == are unequal.

6. The signal generation method of claim 5, wherein a value of the adj is 0.2.

7. The signal generation method of claim 1, wherein before normalizing the I path of four-level signals, the signal generation method further comprises performing Gray mapping on an original I path of four-level signals to obtain the I path of four-level signals.

8. The signal generation method of claim 7, wherein before normalizing the Q path of four-level signals, the signal generation method further comprises performing Gray mapping on an original Q path of four-level signals to obtain the Q path of four-level signals.

9. The signal generation method of claim 8, further comprising outputting the I path of four-level signals and the Q path of four-level signals for normalization.

10. The signal generation method of claim 1, wherein a modulation point of the DDMZM is in a null point.

11. An electronic device, comprising:
a normalization circuit comprising two first output ends;
a mapping circuit comprising:
    two second input ends coupled to the two first output ends; and
    two second output ends;
two digital-to-analog converters (DACs) comprising:
    third input ends coupled to the two second output ends; and
    third output ends;
an amplitude adjustment circuit comprising:
    two fourth input ends coupled to the third output ends; and
    two fourth output ends; and
a dual-drive Mach-Zehnder modulator (DDMZM) comprising:
    an upper arm coupled to one of the two fourth output ends; and
    a lower arm coupled to the other one of the two fourth output ends, wherein the normalization circuit is configured to:
  receive an I path of four-level signals and a Q path of four-level signals;
  normalize the I path of four-level signals and the Q path of four-level signals; and
  output a normalized I path of four-level signals and a normalized Q path of four-level signals to the mapping system,
wherein the mapping circuit is configured to:
  determine a normalization coefficient based on an actual value of a first path of level signals and a maximum value of the first path of level signals, wherein the first path of level signals comprises any path of level signals in the I path of four-level signals and the Q path of four-level signals;
  map the normalized I path of four-level signals and the normalized Q path of four-level signals based on the normalization coefficient; and
  output two paths of six-level signals to the two DACs,
wherein the two DACs are configured to:
  perform digital-to-analog conversion on the two paths of six-level signals to obtain converted signals; and
  output the converted signals to the amplitude adjustment system, and
wherein the amplitude adjustment circuit is configured to:
  adjust amplitudes of the converted signals to a preset amplitude to obtain amplitude-adjusted signals,
  wherein the preset amplitude is less than a target amplitude, and
  wherein the target amplitude is determined by a signal amplitude employed when a 16-level signal drives the DDMZM;
  load the amplitude-adjusted signals to the upper arm and the lower arm of the DDMZM to generate modulation signals.

12. The electronic device of claim 11, wherein the mapping system comprises a first complex number obtaining circuit and a first calculation processing circuit, wherein an output end of the first complex number obtaining circuit is coupled to an input end of the first calculation processing circuit, and wherein the first complex number obtaining circuit is configured to:
  set a first level value of the I path of signals in the normalized I path of four-level signals as a real part of a complex number, and a second level value of the Q path of signals in the normalized Q path of four-level signals as an imaginary part of the complex number, to obtain the complex number corresponding to the normalized I path of four-level signals and the normalized Q path of four-level signals; and
  output the complex number to the first calculation processing circuit, and wherein the first calculation processing circuit is configured to process the normalized I path of four-level signals and the normalized Q path of four-level signals based on the real part and the imaginary part of the complex number and the normalization coefficient, to obtain the two paths of six-level signals.

13. The electronic device of claim 12, wherein the first calculation processing circuit is configured to process the normalized I path of four-level signals and the normalized Q path of four-level signals based on the following formulas, to obtain the two paths of six-level signals:

$$x=(-1-adj)\cdot(sig==-1a+ja)+(3-adj)\cdot(sig==1a+ja)+\\(1+adj)\cdot(sig==1a-ja)+(-3+adj)\cdot(sig==-1a-ja)+\\(1+adj)\cdot(sig==-3a+3ja)+(5+adj)\cdot(sig==3a+\\3ja)+(-5-adj)\cdot(sig==3a-3ja)+(-1-adj)\cdot(sig==-\\3a-3ja)+(1+adj)\cdot(sig==-1a+3ja)+(3-adj)\cdot\\(sig==1a+3ja)+(-3+adj)\cdot(sig==1a-3ja)+(-1-\\adj)\cdot(sig==-1a-3ja)+(5+adj)\cdot(sig==3a+ja)+(-\\1-adj)\cdot(sig==3a+ja)+(-5-adj)\cdot(sig==3a-ja)+\\(1+adj)\cdot(sig==-3a-ja)$$

and $$y=(3-adj)\cdot(sig==-1a+ja)+(-1-adj)\cdot(sig==1a+ja)+(-\\3+adj)\cdot(sig==1a-ja)+(1+adj)\cdot(sig==-1a-ja)+\\(5+adj)\cdot(sig==-3a+3ja)+(1+adj)\cdot(sig==3a+\\3ja)+(-1-adj)\cdot(sig==3a-3ja)+(-5-adj)\cdot(sig==-\\3a-3ja)+(3-adj)\cdot(sig==-1a+3ja)+(1-adj)\cdot\\(sig==1a+3ja)+(-1-adj)\cdot(sig==1a-3ja)+(-3-\\adj)\cdot(sig==-1a-3ja)+(-1-adj)\cdot(sig==3a+ja)+(-\\5+adj)\cdot(sig==3a+ja)+(1+adj)\cdot(sig==3a-ja)+(-\\5+adj)\cdot(sig==-3a-ja)$$

wherein sig is the complex number, wherein a is the normalization coefficient, wherein adj is a fine adjustment parameter, wherein x is a first signal output after the I path of signals are calculated by using a first formula, where y is a second signal output after the Q path of signals are calculated using a second formula, wherein == is a comparison operation, and wherein a comparison operation rule comprises:
an operation result is one when values on both sides of a symbol == are equal; and
an operation result is zero when the values on both sides of the symbol == are unequal.

14. The electronic device of claim 11, wherein the mapping system comprises a second complex number obtaining circuit and a second calculation processing circuit, wherein an output end of the second complex number obtaining circuit is coupled to an input end of the second calculation processing circuit, and wherein the second complex number obtaining circuit is configured to:
  set a first level value of the Q path of signals in the normalized Q path of four-level signals as a real part of a complex number, and a second level value of the I path of signals in the normalized I path of four-level signals as an imaginary part of the complex number, to obtain the complex number corresponding to the normalized I path of four-level signals and the normalized Q path of four-level signals; and
  output the complex number to the second calculation processing circuit, and wherein the second calculation processing circuit is configured to process the normalized I path of four-level signals and the normalized Q path of four-level signals based on the real part and the imaginary part of the complex number and the normalization coefficient, to obtain the two paths of six-level signals.

15. The electronic device of claim 14, wherein the second calculation processing subsystem is configured to process the normalized I path of four-level signals and the normalized Q path of four-level signals based on the following formulas, to obtain the two paths of six-level signals:

$$x=(-1-adj)\cdot(sig==-1a+ja)+(3-adj)\cdot(sig==1a+ja)+\\(1+adj)\cdot(sig==1a-ja)+(-3+adj)\cdot(sig==-1a-ja)+\\(1+adj)\cdot(sig==-3a+3ja)+(5+adj)\cdot(sig==3a+\\3ja)+(-5-adj)\cdot(sig==3a-3ja)+(-1-adj)\cdot(sig==-\\3a-3ja)+(1+adj)\cdot(sig==-1a+3ja)+(3-adj)\cdot\\(sig==1a+3ja)+(-3+adj)\cdot(sig==1a-3ja)+(-1-\\adj)\cdot(sig==-1a-3ja)+(5+adj)\cdot(sig==3a+ja)+(-\\1-adj)\cdot(sig==3a+ja)+(-5-adj)\cdot(sig==3a-ja)+\\(1+adj)\cdot(sig==-3a-ja)$$

and $$y=(3-adj)\cdot(sig==-1a+ja)+(-1-adj)\cdot(sig==1a+ja)+(-\\3+adj)\cdot(sig==1a-ja)+(1+adj)\cdot(sig==-1a-ja)+$$

$(5+adj)\cdot(sig==-3a+3ja)+(1+adj)\cdot(sig==3a+3ja)+(-1-adj)\cdot(sig==3a-3ja)+(-5-adj)\cdot(sig==-3a-3ja)+(3-adj)\cdot(sig==-1a+3ja)+(1-adj)\cdot(sig==1a+3ja)+(-1-adj)\cdot(sig==1a-3ja)+(-3-adj)\cdot(sig==-1a-3ja)+(-1-adj)\cdot(sig==3a+ja)+(-5+adj)\cdot(sig==3a+ja)+(1+adj)\cdot(sig==3a-ja)+(-5+adj)\cdot(sig==-3a-ja)$ wherein sig is the complex number, wherein a is the normalization coefficient, wherein adj is a fine adjustment parameter, wherein x is a first signal output after the I path of signals are calculated by using a first formula, where y is a second signal output after the Q path of signals are calculated using a second formula, wherein == is a comparison operation, and wherein a comparison operation rule comprises:

an operation result is one when values on both sides of a symbol == are equal; and an operation result is zero when the values on both sides of the symbol == are unequal.

16. The electronic device of claim 15, wherein a value of the adj is 0.2.

17. The electronic device of claim 11, further comprising a Gray mapping circuit coupled to the normalization circuit and configured to perform Gray mapping on an original I path of four-level signals to obtain the I path of four-level signals.

18. The electronic device of claim 17, wherein the Gray mapping circuit is further configured to perform Gray mapping on an original Q path of four-level signals to obtain the Q path of four-level signals.

19. The electronic device of claim 18, wherein the Gray mapping circuit is further configured to output the I path of four-level signals and the Q path of four-level signals to the normalization circuit.

20. The electronic device of claim 11, wherein a modulation point of the DDMZM is in a null point.

\* \* \* \* \*